(12) United States Patent
Hsieh

(10) Patent No.: US 9,057,420 B1
(45) Date of Patent: Jun. 16, 2015

(54) PROTECTIVE GUIDING DEVICE FOR USE WITH A CABLE

(71) Applicant: KANG YANG HARDWARE ENTERPRISES CO., LTD., New Taipei (TW)

(72) Inventor: Shu-Li Hsieh, New Taipei (TW)

(73) Assignee: KANG YANG HARDWARE ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 14/475,529

(22) Filed: Sep. 2, 2014

(51) Int. Cl.
*F16G 13/16* (2006.01)
*H02G 11/00* (2006.01)
*F16L 3/015* (2006.01)

(52) U.S. Cl.
CPC .............. *F16G 13/16* (2013.01); *H02G 11/00* (2013.01); *F16L 3/015* (2013.01)

(58) Field of Classification Search
CPC .......... F16G 13/16; H02G 11/00; F16L 3/015
USPC ................................. 59/78.1, 900; 248/48, 49
See application file for complete search history.

(56) References Cited

U.S. PATENT DOCUMENTS

| 5,768,882 | A * | 6/1998 | Weber et al. ................... 59/78.1 |
| 6,128,893 | A * | 10/2000 | Weber et al. ................... 59/78.1 |
| 6,864,425 | B2 * | 3/2005 | Ikeda et al. .................... 59/78.1 |
| 7,406,819 | B2 * | 8/2008 | Utaki et al. .................... 59/78.1 |
| 7,893,353 | B2 * | 2/2011 | Utaki ............................. 59/900 |
| 7,971,833 | B2 * | 7/2011 | Utaki et al. .................... 248/49 |
| 8,505,272 | B1 * | 8/2013 | Komiya ......................... 59/78.1 |

* cited by examiner

*Primary Examiner* — David B Jones
(74) *Attorney, Agent, or Firm* — Guice Patents PLLC

(57) ABSTRACT

The present invention relates to a protective guiding device for used in cable, including: a plurality of connection rack units for being connected and formed as a chain; and two turning and positioning structures, each of the structures includes an intermediate member and a fasten member, and adjacent surfaces defined on the two members are formed with a plurality of positioning concave parts and positioning convex parts capable of being mutually engaged; when the fasten member is outwardly pulled, and a buckle hole thereof is enabled to compress an elastic member relative to a buckle hook of the intermediate member, so the positioning convex parts and positioning concave parts are released and the fasten member can be turned to a desired angle then be released for allowing the elastic member to be stretched, so the positioning convex parts and the positioning concave parts are engaged for forming a positioning status.

8 Claims, 7 Drawing Sheets

PROTECTIVE GUIDING DEVICE FOR USE WITH A CABLE

BACKGROUND OF THE INVENTION

1. Field of the Invention

The present invention relates to a protective guiding device for use with a cable, especially to a protective guiding device for use with the cable and having a function of sliding in multiple directions.

2. Description of Related Art

A protective guiding device is commonly applied in an automated mobile member such as a mechanical arm of a mechanical equipment, so flexible cables or pipes connected to the mobile member can be prevented from being twisted with each other.

As shown in FIG. 1 and FIG. 2, a conventional protective guiding device includes a plurality of connection rack units 10, each of the connection rack units 10 is formed with a pair of lateral walls 101, and two ends of the pair of lateral walls 101, e.g. the front and the rear ends, are respectively and radially formed a pair of pivotal shafts 102 and a pair of pivotal holes 103, and another two ends of the pair of lateral walls 101, e.g. the bottom and the top ends, are respectively formed with a bottom connection board 104 (referring to FIG. 2) and a connection arm 105 detachably connected to the pair of lateral walls 101, so an accommodation space 106 allowing a cable to be accommodated is axially formed between the pair of lateral walls 101, the bottom connection board 104 and the connection arm 105. When the protective guiding device is assembled, the pair of pivotal shafts 102 at the front end of each of the connection rack units 10 are inserted in the pair of pivotal holes 103 at the rear end of the adjacent connection rack unit 10, thereby being connected and formed as a flexible chain, and an objective of protecting and guiding the cable is achieved.

Two ends of the above-mentioned chain are respectively pivoted with a fasten member 107, the two fasten members 107 are respectively connected to a mobile member and a fixed member of the mechanical equipment, so the fasten member 107 at one end of the protective guiding device is enabled to move with the mobile member for forming a linear status (as shown in FIG. 1) or a bending status (as shown in FIG. 2). However, one disadvantage of the above-mentioned protective guiding device is that the protective guiding device is restrained by the connecting direction of the two fasten members 107, so the protective guiding device is only able to move towards one direction thereby being unable to match with the installed locations and angles of the mobile member and the fixed member of the mechanical equipment.

SUMMARY OF THE INVENTION

One primary objective of the present invention is to provide a protective guiding device for use with a cable, in which fasten members at two ends thereof are provided with a turning and positioning function, thereby being able to match with the installed locations and angles of a mobile member and a fixed member of a mechanical equipment, so the protective guiding device is provided with a function of sliding in multiple directions thereby expanding the applicable range.

For achieving said objective, one technical solution of the present invention is provide a protective guiding device for use with the cable, which includes: a plurality of connection rack units, the interior of each of the connection rack units is axially formed with an accommodation space allowing a cable to be accommodated, two ends thereof are respectively and radially formed with a pivotal part, thereby allowing the connection rack units to be connected and formed as a chain; and two turning and positioning structures, connected at two ends of the chain, wherein each of the turning and positioning structures includes: an intermediate member, wherein a pair of wing sheets formed at the inner side thereof are radially and oppositely formed with a pair of connection parts pivoted with the pivotal parts at two ends of the chain, and the outer side thereof is axially extended with a buckle hook having an arrow-like elastic hook part, and the intermediate member is formed with a penetrated groove communicated with the accommodation space; and a fasten member, the inner side thereof is formed with a buckle hole allowing the buckle hook to be penetrated, and an elastic member is sleeved on the buckle hook, so the elastic member is able to be disposed between the hook part and the buckle hole, and adjacent surfaces defined on the intermediate member and the fasten member are formed with a plurality of positioning concave parts and a plurality of positioning convex parts capable of being mutually engaged; when the fasten member is outwardly pulled, and the buckle hole is enabled to compress the elastic member relative to the hook part, so the positioning convex parts and the positioning concave parts are released and the fasten member is able to be turned to a desired angle then be released for allowing the elastic member to be stretched, so the positioning convex parts and the positioning concave parts are engaged for forming a positioning status.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
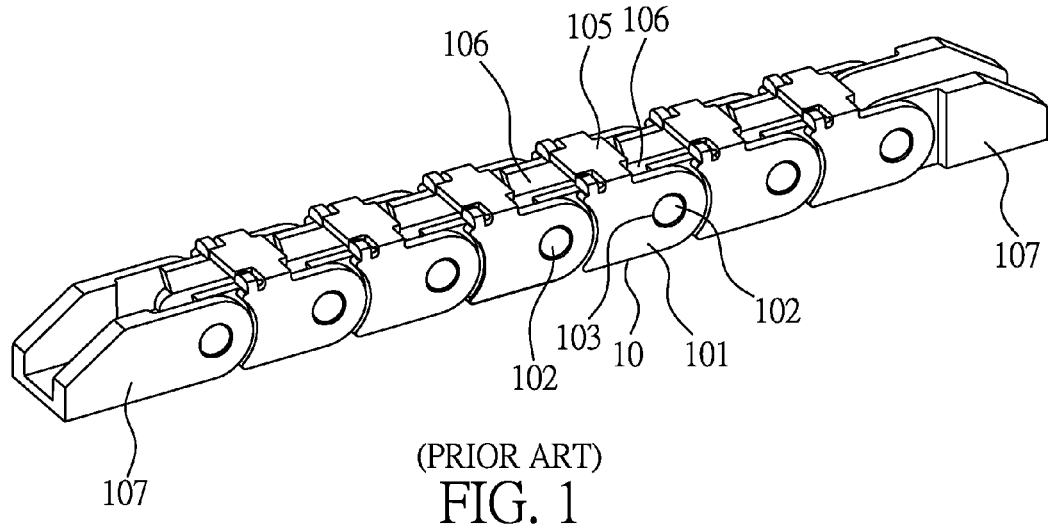
FIG. 1 is a perspective view illustrating a conventional protective guiding device.
Figure 2:
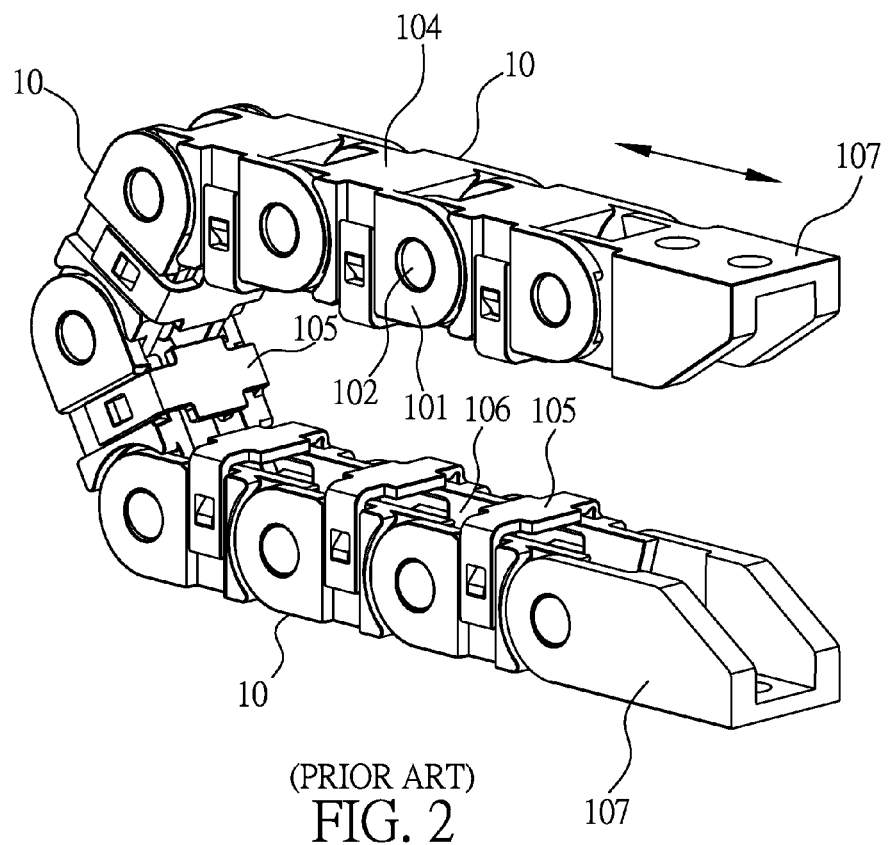
FIG. 2 is a perspective view illustrating the conventional protective guiding device being operated.

Referring from FIG. 3 to FIG. 7d, the present invention provides a protective guiding device, which includes a plurality of connection rack units 1 for being connected as a chain, wherein the structural configuration of the connection rack unit 1 is substantially the same as the conventional connection rack unit, in other words each of the connection rack units 1 is formed with a pair of lateral walls 11, two ends of the pair of lateral walls 11, e.g. the front and the rear ends, are respectively and radially formed with a pair of pivotal parts, e.g. a pair of pivotal shafts 12 and a pair of pivotal holes 13, and another two ends of the pair of lateral walls 11, e.g. the bottom and the top ends, are respectively formed with a bottom connection board 14 and a connection arm 15 detachably connected to the pair of lateral walls 11, so an accommodation space 16 allowing a cable to be accommodated is axially formed between the pair of lateral walls 11, the bottom connection board 14 and the connection arm 15.

When the protective guiding device is assembled, the pair of pivotal shafts 12 at one end of each of the connection rack units 1 are inserted in the pair of pivotal holes 13 at another end of the adjacent connection rack unit 1, thereby being connected and formed as a flexible chain; meanwhile, a restrain mechanism 17 is respectively formed at the pivotal locations defined by the pivotal shafts 12 and the pivotal holes 13 of the two adjacent connection rack units 1, for example a pair of positioning tenons 171 penetrating into a pair of fan-like positioning slots 172, thereby enabling the bending angle of the two adjacent connection rack units 1 to be restrained so as to achieve an objective of protecting and guiding the cable.

Figure 4:
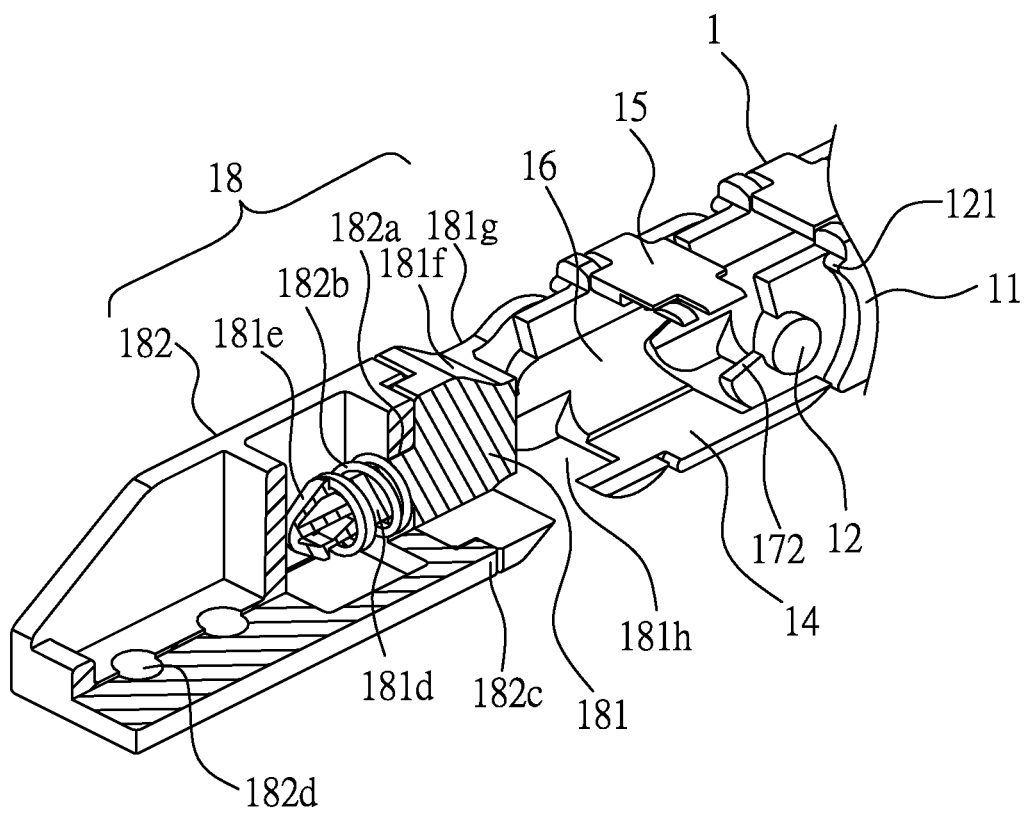
FIG. 4 is a perspective view illustrating a partially crossed area of the turning and positioning structure of the protective guiding device according to the present invention.

Two ends of the chain are respectively connected with a turning and positioning structure 18, and each of the turning and positioning structures 18 includes an intermediate member 181 and a fasten member 182. A pair of wing sheets 181a formed at the inner side of the intermediate member 181 are radially and oppositely formed with a pair of connection parts, e.g. shaft bolts 181b or bolt holes 181c, for being pivoted with the pivotal parts, e.g. the pivotal holes 13 or the pivotal shafts 12, of the adjacent connection rack unit 1, and the outer side of the intermediate member 181 is axially extended with a buckle hook 181d having an arrow-like elastic hook part 181e. The inner side of the fasten member 182 is formed with a buckle hole 182a allowing the buckle hook 181d to be penetrated, then an elastic member 182b, e.g. a spring or an elastic piece, is sleeved on the buckle hook 181d, so the elastic member 182b is able to be disposed between the hook part 181e and the buckle hole 182a (as shown in FIG. 4), thereby enabling the fasten member 182 to be provided with an elastic force for being outwardly pulled and inwardly recovered.

Figure 3:
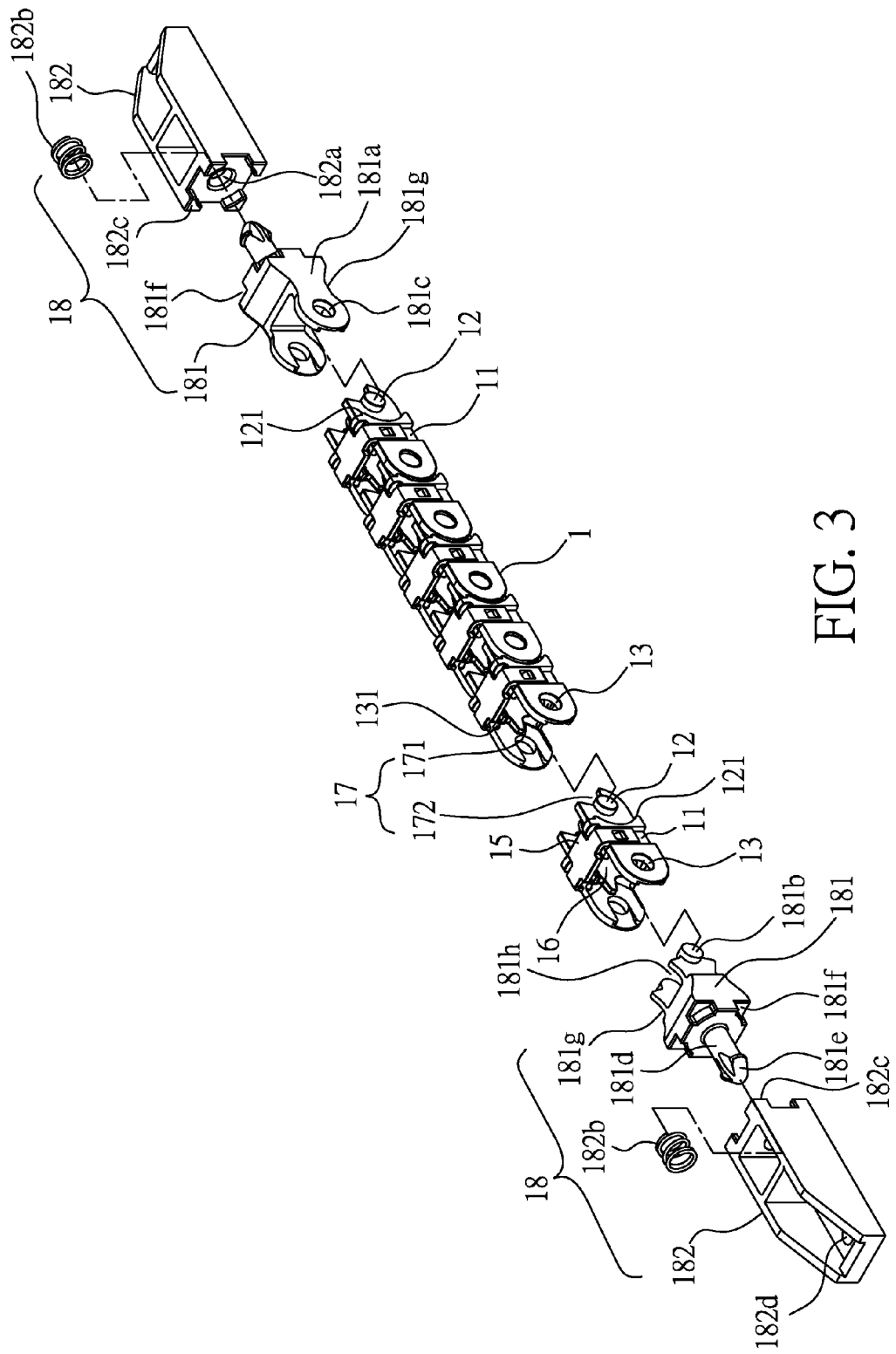
FIG. 3 is a perspective exploded view illustrating the protective guiding device according to the present invention.

In addition, for providing a turning and positioning function to the fasten member 182 relative to the intermediate member 181, a plurality of positioning concave parts 181f and a plurality of positioning convex parts 182c capable of being mutually engaged are formed on adjacent surfaces defined on the intermediate member 181 and the fasten member 182, thereby allowing the fasten member 182 to be turned 360 degrees and positioned relative to the intermediate member 181. As shown in FIG. 3, the quantity of the positioning concave parts 181f and the quantity of the positioning convex parts 182c are plural, e.g. four, and respectively formed on the edges, e.g. at four corners, of the adjacent surfaces defined on the intermediate member 181 and the fasten member 182, but what shall be addressed is that the quantity and locations of the positioning concave parts 181f and the positioning convex parts 182c are not limited to what has been shown in figures, it is well known by skilled people in the art that altering the quantity and locations of the positioning concave parts 181f and the positioning convex parts 182c for achieving the turning and positioning function; when the intermediate member 181 is put in practice, the shape thereof is not limited to the rectangle as shown in the figures, but could be also formed in round or geometric. What has been mentioned as above shall be within the scope of the present invention.

Moreover, the bottom surface of the fasten member 182 is formed with at least one fasten hole 182d for allowing a conventional connection member, e.g. a screw, to be passed the fasten holes 182d of the two fasten members 182 and respectively locked with a fixed member and a mobile member of a conventional mechanical equipment.

Furthermore, the top and the bottom surfaces of the pair of wing sheets 181a of each of the intermediate members 181 are oppositely formed with a pair of arc-shaped concave surfaces 181g, and the pivotal parts at two sides of the pair of lateral walls 11 of each of the connection rack units 1, e.g. the top and the bottom surfaces at the inner sides of the pair of pivotal shafts 12 and the pair of pivotal holes 13, are oppositely formed with a pair of stop ends 121 for being served as a limit to the up/down swinging movement of each of the intermediate members 181 relative to the adjacent connection rack unit 1.

Figure 5:
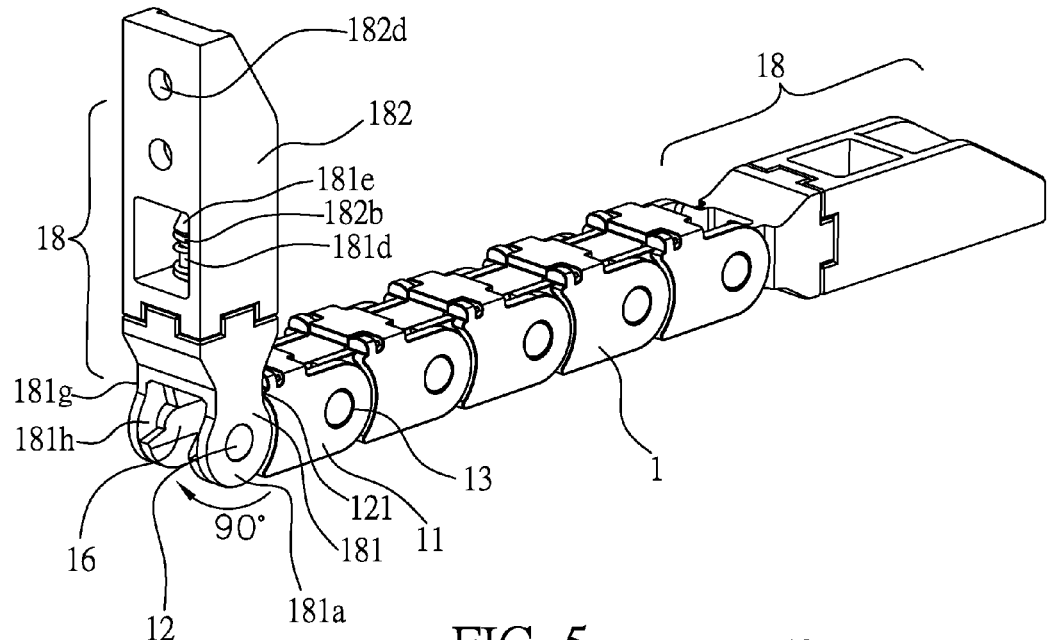
FIG. 5 and FIG. 6 are perspective views illustrating the fasten structure of the protective guiding device being upwardly and downwardly turned 90 degrees according to the present invention.

As shown in FIG. 5, after the intermediate member 181 at the left side is upwardly turned 90 degrees, the pair of arc-shaped concave surfaces 181g at the top surface of the two wing sheets 181a are abutted against the pivotal parts of the adjacent pair of lateral walls 11, e.g. the stop ends 121 at the inner top surface of the pair of pivotal shafts 12, so the fasten member 182 at the left side is able to be upwardly turned 90 degrees for being connected to the mobile member of the mechanical equipment; the fasten member 182 at the right side is connected to the fixed member of the mechanical equipment for allowing the fasten member 182 at the left side to upwardly slide with the fixed member.

Figure 6:
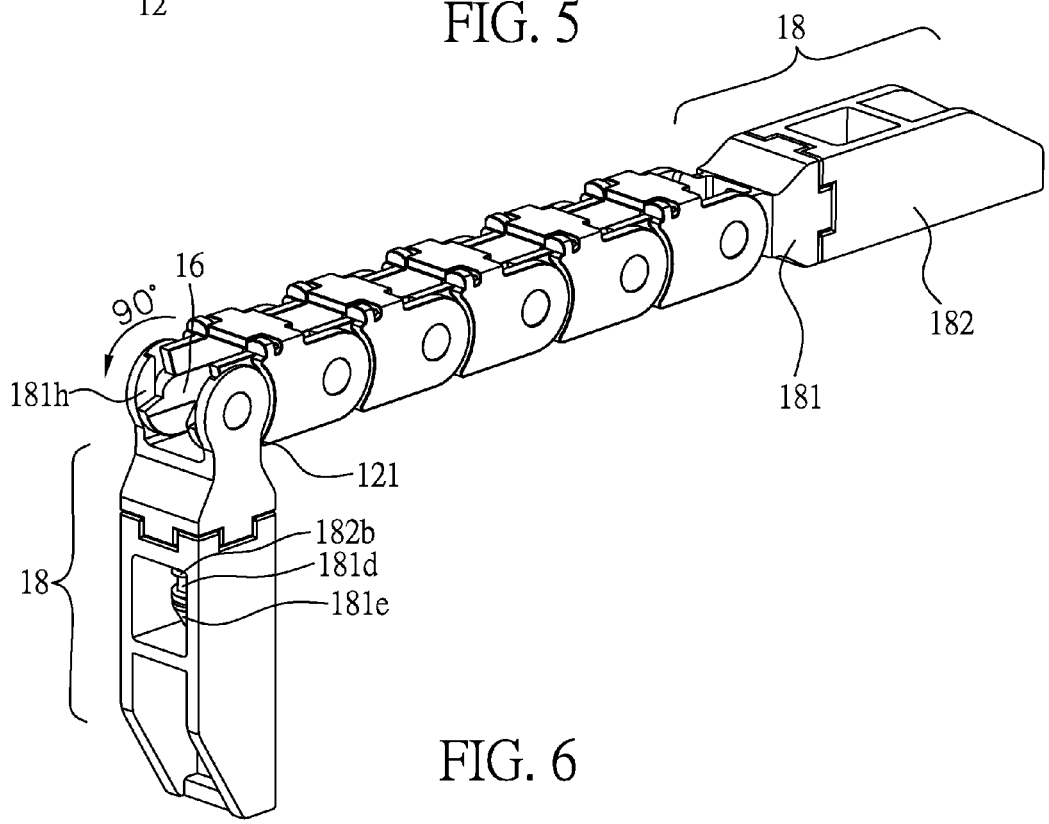

As shown in FIG. 6, after the intermediate member 181 at the left side is downwardly turned 90 degrees, the pair of arc-shaped concave surfaces 181g at the bottom surface of the two wing sheets 181a are abutted against the pivotal parts of the adjacent pair of lateral walls 11, e.g. the stop ends 121 at the inner bottom surface of the pair of pivotal shafts 12, so the fasten member 182 at the left side is able to be downwardly turned 90 degrees for being connected to the mobile member of the mechanical equipment; the fasten member 182 at the right side is connected to the fixed member of the mechanical equipment for allowing the fasten member 182 at the left side to downwardly slide with the fixed member.

Referring to FIG. 5 and FIG. 6, the two intermediate members 181 are respectively formed with a penetrated groove 181h communicated with the accommodation space 16 of the chain, so the cable accommodated in the accommodation space 16 is able to penetrate out from each of the penetrated grooves 181h so as to be respectively connected to the mobile member and the fixed member of the mechanical equipment.

Figure 7A:
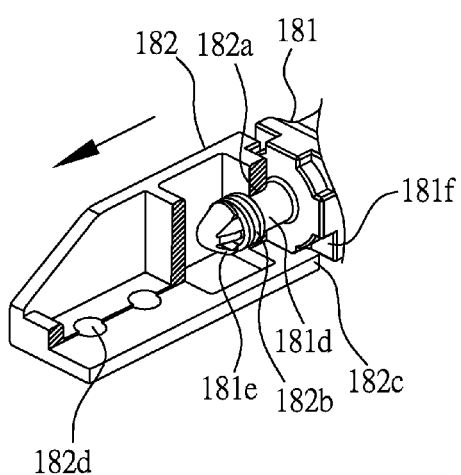
FIG. 7a to FIG. 7d are flowcharts illustrating the turning and positioning structure of the protective guiding device being turned according to the present invention.
Figure 7B:
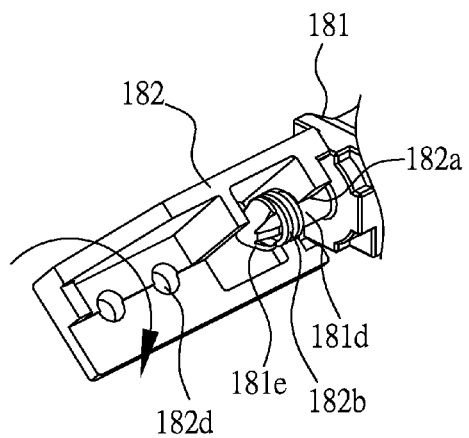
Figure 7C:
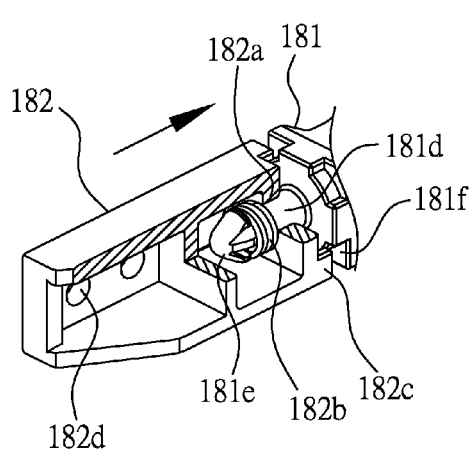
Figure 7D:
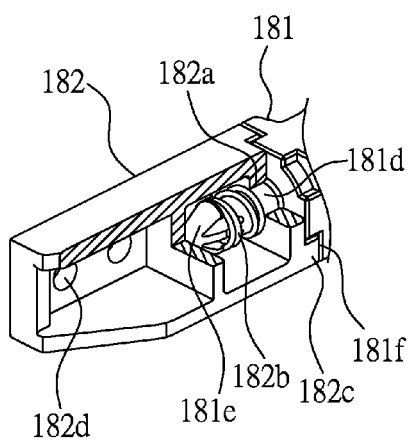

As shown from FIG. 7a to FIG. 7d, which are flowcharts illustrating the fasten member 182 of the turning and positioning structure 18 being turned and positioned relative to the intermediate member 181; when the fasten member 182 is desired to be turned, firstly the fasten member 182 is outwardly pulled for allowing the buckle hole 182a to be outwardly moved along the buckle hook 181d, and the buckle hole 182a is enabled to compress the elastic member 182b relative to the hook part 181e, thereby allowing the positioning convex parts 182c and the positioning concave parts 181f to be released so as to form a turning status (as shown in FIG. 7a); then, the fasten member 182 is clockwise or counterclockwise turned (as shown in FIG. 7b); until the fasten hole 182d of the fasten member 182 being adjusted and aimed at the object to be connected, e.g. the mobile member of the mechanical equipment, in other words after the fasten member being turned to the desired angle, the fasten member 182 is immediately released (as shown in FIG. 7c); lastly, the elastic member 182b is stretched for pushing the fasten member 182 to be inwardly moved, thereby allowing the positioning convex parts 182c and the positioning concave parts 181f to be engaged so as to form a positioning status (as shown in FIG. 7d), so the fasten member 182 is enabled to be clockwise turned 90 degrees relative to the intermediate member 181.

Figure 8:
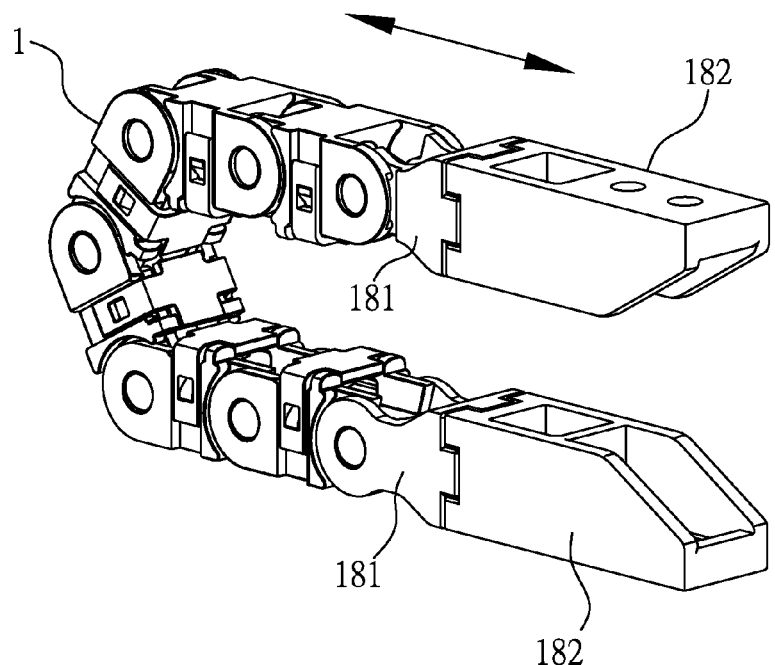
FIG. 8 to FIG. 11 are schematic views illustrating various sliding statuses of the protective guiding device according to the present invention.
Figure 9:
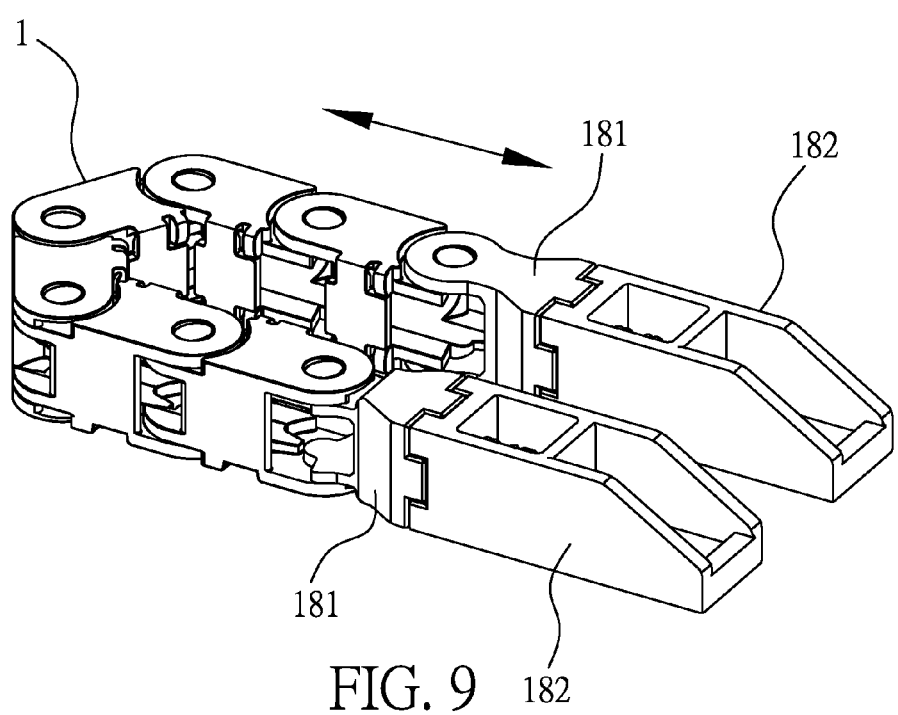

As shown in FIG. 8, the fasten members 182 at two ends of the chain are respectively connected to a mobile member and a fixed member (both not shown in figures) at the top and the bottom of a mechanical equipment, so the fasten member 182 at the top is able to upwardly/downwardly slide with the mobile member and relative to the fasten member 182 at the bottom. As shown in FIG. 9, after the fasten members 182 at two ends of the chain are turned and positioned with respect to the operation steps disclosed from FIG. 7a to FIG. 7d, the two fasten members 182 are formed in a parallel status and respectively connected to a mobile member and a fixed member (both not shown in figures) adjacently disposed on the same plane of a mechanical equipment, so the fasten member 182 at one end is able to leftwardly/rightwardly slide with the mobile member and relative to the fasten member 182 at the other end.

Figure 10:
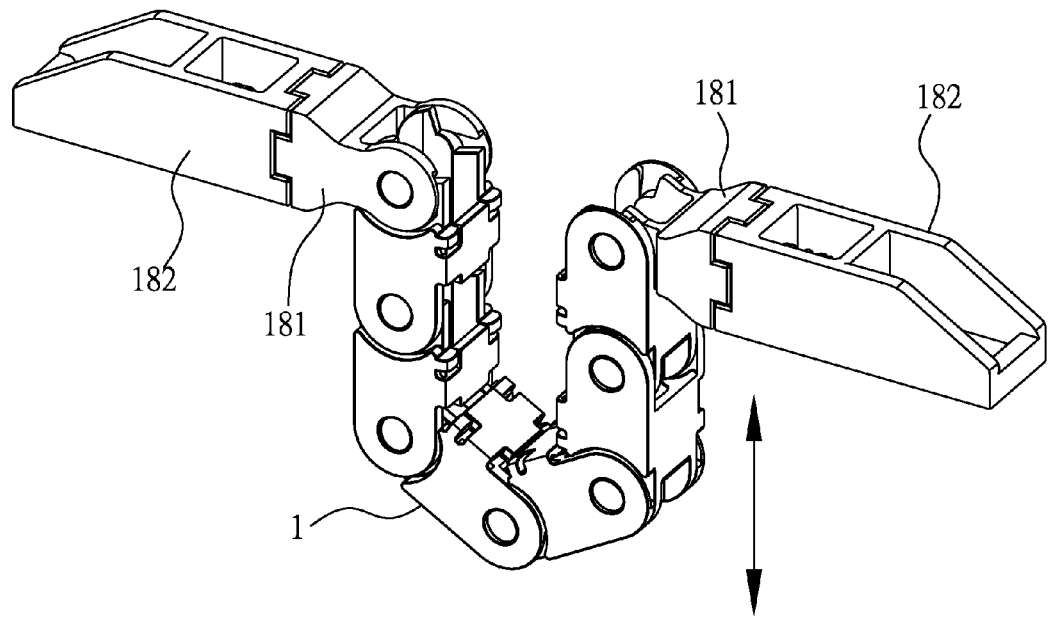
Figure 11:
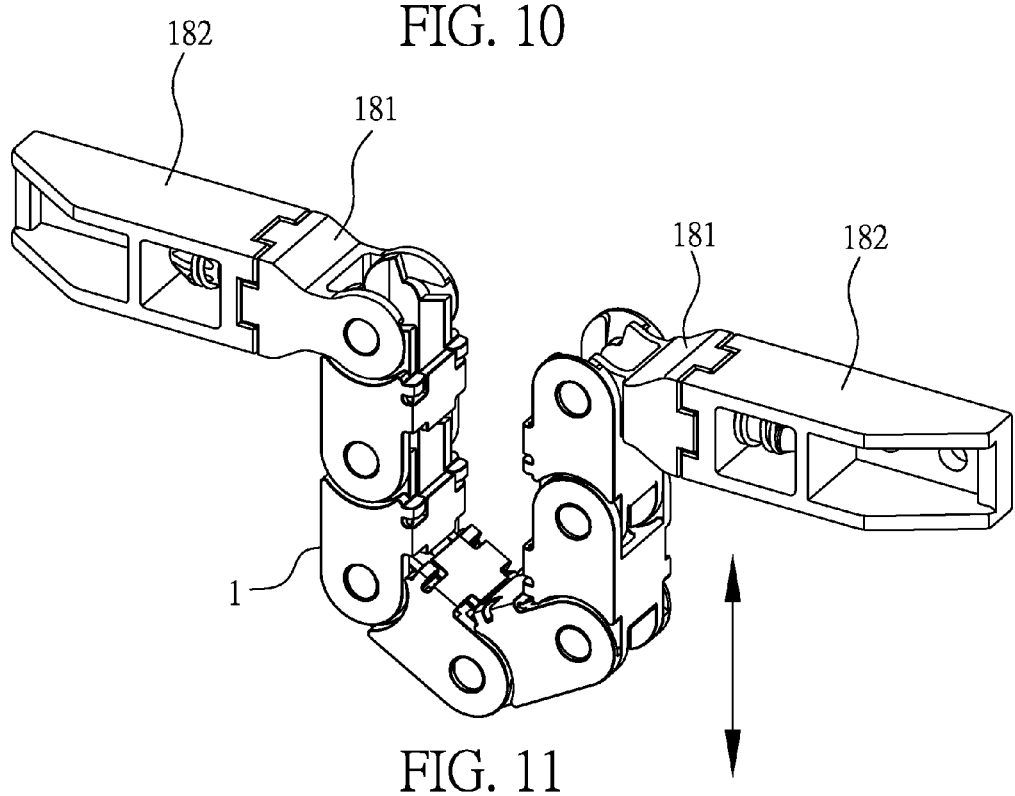

As shown in FIG. 10 and FIG. 11, after the fasten members 182 at two ends of the chain are turned and positioned with respect to the operation steps disclosed from FIG. 7a to FIG. 7d, the two fasten members 182 are formed in a linear status and respectively connected to a mobile member and a fixed member (both not shown in figures) separately disposed on the same plane of a mechanical equipment, so the fasten member 182 at one end is able to upwardly/downwardly slide with the mobile member and relative to the fasten member 182 at the other end. Wherein, a 90-degree turning status is formed due to the different connecting locations defined by the fasten members 182 shown in FIG. 9 and FIG. 10 and the objects to be connected, e.g. the mobile member and the fixed member, so the applicable range is expanded.

Based on what has been disclosed above, advantages achieved by the present invention are as followings: the turning and positioning structures formed at two ends of the chain formed through connecting a plurality of the connection rack units allow the installed location and angle of the fasten member of each of the turning and positioning structures to be adjusted relative to the intermediate member and with respect to the different connecting locations of the objects to be connected, e.g. the mobile member and the fixed member, so the protective guiding device of the present invention is provided with a function of sliding in multiple directions thereby expanding the applicable range. Accordingly, the protective guiding device provided by the present invention is novel and more practical in use comparing to the prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A protective guiding device for use with a cable, comprising:
a plurality of connection rack units, an interior of each of said connection rack units being axially formed with an accommodation space allowing the cable to be accommodated, two ends of each said connection rack unit being respectively and radially formed with a pivotal part, thereby allowing said connection rack units to be connected and formed as a chain, said chain having two ends; and
two turning and positioning structures, respectively connected at said two ends of said chain, wherein each of said turning and positioning structures including:
an intermediate member having a pair of wing sheets formed at an inner side thereof, said pair of wing sheets being radially and oppositely formed with a pair of connection parts pivotally connected with said pivotal parts at said two ends of said chain, and said intermediate member having a buckle hook extending from an outer side thereof, said buckle hook having an arrow-like elastic hook part, and said intermediate member being formed with a penetrated groove located between said pair of connection parts, said penetrated groove communicating with said accommodation space; and
a fasten member, an inner side thereof being formed with a buckle hole and said buckle hook being inserted therein, and an elastic member being sleeved on said buckle hook, said elastic member being disposed between said hook part and said buckle hole, and adjacent surfaces of said intermediate member and said fasten member being formed with a plurality of positioning concave parts and a plurality of positioning convex parts respectively, the plurality of positioning convex parts being mutually engaged with said plurality of positioning concave parts;
wherein, when said fasten member is pulled outwardly away from said intermediate member, said buckle hole compressing said elastic member against said hook part, and said positioning convex parts and said positioning concave parts are separated and said fasten member is rotatable to a desired angle relative to said intermediate member then is released, when said fasten member is released, said elastic member expanding, and said positioning convex parts and said positioning concave parts are engaged and securing said fastening member in the desired angle relative to said intermediate member.

2. The protective guiding device for use with the cable as claimed in claim 1, wherein each of said connection rack units is formed with a pair of lateral walls, two ends of said pair of lateral walls are respectively and radially formed with said pair of pivotal parts, and another two ends of said pair of lateral walls are respectively formed with a bottom connection board and a connection arm detachably connected to said pair of lateral walls, and said accommodation space is axially formed between said pair of lateral walls, said bottom connection board and said connection arm.

3. The protective guiding device for use with the cable as claimed in claim 2, wherein said pivotal parts at two sides of said pair of lateral walls of said connection rack unit are a pair of pivotal shafts and a pair of pivotal holes; and said connection parts of said pair of wing sheets of said intermediate member are a pair of shaft bolts and a pair of bolt holes pivoted with said pair of pivotal holes and said pair of pivotal shafts.

4. The protective guiding device for use with the cable as claimed in claim 3, wherein a restrain mechanism is respectively formed at pivotal locations defined by said pivotal shafts and said pivotal holes of said two adjacent connection rack units, and said restrain mechanism is a pair of positioning tenons penetrating into a pair of fan-like positioning slots, thereby enabling a bending angle of said two adjacent connection rack units to be restrained.

5. The protective guiding device for use with the cable as claimed in claim 1, wherein said elastic member is selected from a group consisting of a spring and an elastic piece.

6. The protective guiding device for use with the cable as claimed in claim 1, wherein a quantity of said positioning concave parts and a quantity of said positioning convex parts are plural and respectively formed on the edges of said adjacent surfaces defined on said intermediate member and said fasten member.

7. The protective guiding device for use with the cable as claimed in claim 1, wherein said fasten member is formed with at least one fasten hole.

8. The protective guiding device for use with the cable as claimed in claim 1, wherein top and bottom surfaces of said pair of wing sheets of each of said intermediate members are oppositely formed with a pair of arc-shaped concave surfaces, and top and bottom surfaces of said pivotal parts at two sides of said pair of lateral walls of each of said connection rack units are respectively and oppositely formed with a pair of stop ends capable of abutting against said pair of arc-shaped concave surfaces and limiting an upwardly and downwardly swinging movement of each of said intermediate members relative to said adjacent connection rack unit.

\* \* \* \* \*